Patented Sept. 28, 1943

2,330,717

UNITED STATES PATENT OFFICE 2,330,717

GEOCHEMICAL PROSPECTING

Leo Horvitz, Houston, Tex., assignor to Esme E. Rosaire, Houston, Tex.

No Drawing. Application December 9, 1940, Serial No. 369,214

7 Claims. (Cl. 23—232)

This invention relates to the art of exploration for oil, gas and related deposits by chemical methods, and to chemical analysis.

The present invention is a continuation in part of application No. 183,960, filed January 8, 1938, now Patent No. 2,287,101.

Previous to the invention disclosed in the above mentioned application, soil gas was pumped or allowed to diffuse from soil into a suitable container and subsequently analyzed for hydrocarbon contents. In accordance with the disclosure of the above mentioned invention, samples of soil are taken from the earth and transported to the laboratory in sealed containers for treatment and analysis. Such method involves utilization of the constituents entrained in the soil rather than depending solely on entrapped air or gas, whereby entrapped gas is meant the gas contained in the voids in the soil, and entrained constituents means those which are closely held by the soil as by solution or loose chemical combination, or in the cases of entrained gases, those which are held by adsorption, occlusion or in combination.

The present invention has for its object the improvement of the analysis of the soil for the volatilizable entrained gases to be evolved, and to analyze the evolved gases for significant content, where by significant content is meant those substances like methane and heavier hydrocarbons, hydrogen and/or carbon monoxide which are indicative of the presence of the sought deposits.

An object is to provide a sample which is richer in significant content than has heretofore been available; thus dilution by soil air which has obscured results in the past is reduced, so that the sensitivity of the analysis is greater.

Another object is to provide a treatment for the soil samples by which the entrapped air is withdrawn (and in practice usually discarded), subsequent to which the entrained volatilizable constituents are caused to be liberated to form a sample for analysis.

In operation the soil sample to be analyzed is placed in a closed container, the pressure is reduced to approximately 100 mm. of mercury to remove the major portion of the entrapped or interstitial soil air which has been found to be lean in the sought constituents and which is discarded. Then the soil is degassed by known methods, such as heating and/or the resort to chemical disintegration of the soil sample, and the gas sample so obtained is subjected to analysis.

In accordance with the parent application, Ser. No. 183,960, the constituents lighter than ethane are determined by combustion, utilizing the oxygen present in the air collected from the soil sample. For this reason, a pressure of 100 mm. is about right for the pressure at which the gas to be discarded is withdrawn from the soil, because at this pressure sufficient oxygen is left in the soil to burn the constituents lighter than ethane. A lower pressure might result in inadequate oxygen for this purpose, while a higher pressure would result in undue dilution of the gas sample with soil air. The utilization of a pressure of 100 mm. is not necessarily a lower limit, because purified air may be added, if necessary, for the analysis of the gas sample. It has been found satisfactory to use pressures as low as 50 and as high as 200 mm. It may be generally stated that the pressure may be as low as the vapor pressure of water at normal room temperature for the removal of interstitial air. Since, however, the determination of hydrogen, methane, and carbon-monoxide is preferably conducted on the same sample as is used to determine the heavier hydrocarbons, the most desirable pressure for the partial elimination of the interstitial air is of the order of 100 mm.

After the interstitial air is removed and discarded, the soil sample is subjected to an additional, preferably more vigorous, degassing treatment, and the gas so recovered is permitted to expand into a previously evacuated bulb or chamber, or it may be pumped into such a bulb or into an analytical apparatus by means of a Toepler pump, or by displacing the gas from the soil sample treating zone with a fluid such as a heavy gas or liquid. The further degassing treatment may be conducted under the same conditions as the initial degassing treatment where these conditions included a low pressure and an elevated temperature. In this case, with a pressure of about 100 mm. and a temperature of about 100° C., the initial degassing operation is permitted to progress for a period of between one and three minutes, the gas obtained during the period being discarded, and it is then permitted to proceed for a longer period for the recovery of the gas for analysis. It is much preferred, however, to perform the initial degassing merely by reducing the pressure, and then to use more vigorous conditions in the second stage of the degassing operation, such as the addition of heat and/or the treatment of the soil sample with an acid such as HCl, H$_3$PO$_4$, or the like, or other suitable chemicals such as NH$_4$Cl or NaOH, preferably while the aforesaid low pressure employed in the first stage is maintained or even diminished. The gas recovered from the second stage of the degassing treatment is treated to remove therefrom $CO_2$ and $H_2O$, and is then ready for analysis for significant constituents.

The advantages of the procedure reside principally in obtaining soil-gas samples which contain higher percentages of the sought hydrocarbons and other significant constituents including hydrogen. When gas which consists mostly of air is analyzed for combustible constituents the accuracy falls off rapidly when the concentration of the constituents is of the order of only a few parts per million parts of air. Although highly efficient recovery of the combustible constituents heavier than methane is possible with apparatus such as described in U. S. Patent 2,177,139, it is still highly advantageous to obtain gas samples containing more than a few parts per million of the constituents. In the case of methane and hydrogen which cannot be condensed at the temperature of readily available refrigerants such as liquid air or nitrogen, it has also been found advantageous to obtain richer samples than are possible when all the interstitial soil air is permitted to be included in the gas sample.

The nature and objects of the present invention having been thus described, what is claimed as new and useful and is desired to be secured by Letters Patent is:

1. A method for recovering a sample of gas containing hydrocarbons for analysis from a soil sample containing firmly adhering normally gaseous hydrocarbons, which comprises confining the soil sample in a closed system, subjecting the sample to a degassing treatment suitable for the removal therefrom only of interstitial gas, discarding such gas from the system, then subjecting the soil sample to an additional degassing treatment to remove therefrom a second quantity of gas, and collecting this latter quantity of gas for analysis for the hydrocarbon content thereof.

2. A method for recovering a sample of gas containing hydrocarbons for analysis from a soil sample containing firmly adhering normally gaseous hydrocarbons which comprises confining the soil sample in a closed system, subjecting the soil sample to a degassing treatment suitable for the removal therefrom only of interstitial gas, discarding such gas from the system, then subjecting the soil sample to a more vigorous degassing treatment to recover therefrom a second quantity of gas, and collecting this latter quantity of gas for analysis for the hydrocarbon content thereof.

3. In the art of exploration for buried petroliferous deposits by detecting their leakage products by systematically sampling soil and analyzing the samples for significant constituents, the method of preparing a soil gas sample for analysis, comprising the steps of subjecting the soil sample in a closed space to a pressure substantially below atmospheric for a period of time to remove entrapped air, expelling said air from said closed space, and then heating the sample while continuing to maintain the subatmospheric pressure to evolve the entrained constituents in gaseous form and collecting said latter gas for analysis.

4. A method for recovering a sample of gas containing hydrocarbons for analysis from a soil sample containing firmly adhering normally gaseous hydrocarbons which comprises confining the sample in a closed system, subjecting the sample to a degassing treatment suitable for the removal therefrom only of interstitial gas, discarding such gas from the system, then subjecting the sample to a more vigorous degassing treatment to recover therefrom a second quantity of gas, collecting this latter quantity of gas and treating it for the removal therefrom of carbon dioxide and water vapor whereby it is placed in condition for analysis thereof for hydrocarbons.

5. A method for treating a soil sample containing entrained or adsorbed normally gaseous hydrocarbons for the recovery therefrom of a hydrocarbon containing gas sample for analysis which comprises confining the sample in a closed system, subjecting the sample to a pressure substantially below atmospheric for a period of time sufficient to remove at least a part of the interstitial gas from the sample, discarding said gas from the system, then subjecting the sample to heat while maintaining subatmospheric pressure to evolve a further quantity of gas therefrom including normally gaseous hydrocarbons, and collecting the latter quantity of evolved gas for the purpose of analysis for the hydrocarbon contents.

6. A method for treating a soil sample containing entrained or adsorbed normally gaseous hydrocarbons for the recovery therefrom of a hydrocarbon containing gas sample for analysis which comprises confining the sample in a closed system, subjecting the sample to a pressure substantially below atmospheric for a period of time sufficient to remove interstitial gas from the sample, discarding said gas from the system, then subjecting the sample to heat while maintaining subatmospheric pressure to evolve a further quantity of gas therefrom including normally gaseous hydrocarbons, collecting the latter quantity of evolved gas and treating it for the removal therefrom of carbon dioxide and water vapor whereby the gas is placed in condition for analysis thereof for hydrocarbons.

7. The method of geochemical exploration by analysis of soil samples comprising the steps of subjecting a soil sample to heat and partial vacuum to evolve easily liberated gaseous products consisting largely of entrapped air, rejecting the evolved gaseous products, continuing the application of heat and partial vacuum for an additional period of time to evolve adsorbed gases from the sample, collecting the last mentioned evolved gases, and analyzing the collected gases for hydrocarbons and their derivatives.

LEO HORVITZ.